US008677636B2

(12) United States Patent
Kelley (10) Patent No.: US 8,677,636 B2
(45) Date of Patent: Mar. 25, 2014

(54) DOOR INSTALLATION TOOL AND METHOD

(75) Inventor: Travis Kelley, Backus, MN (US)

(73) Assignee: JenTra LLC, Backus, MN (US)

( * ) Notice: Subject to any disclaimer, the term of this patent is extended or adjusted under 35 U.S.C. 154(b) by 203 days.

(21) Appl. No.: 13/371,004

(22) Filed: Feb. 10, 2012

(65) Prior Publication Data

US 2012/0204434 A1 Aug. 16, 2012

Related U.S. Application Data

(60) Provisional application No. 61/442,111, filed on Feb. 11, 2011, provisional application No. 61/529,163, filed on Aug. 30, 2011.

(51) Int. Cl.
*E04F 21/00* (2006.01)

(52) U.S. Cl.
USPC .............................. 33/194; 33/379

(58) Field of Classification Search
USPC ........ 33/194, 379, 613, 645; 52/127.7, 127.8, 52/DIG. 1
See application file for complete search history.

(56) References Cited

U.S. PATENT DOCUMENTS

| 4,278,244 | A | * | 7/1981 | Carter | 269/152 |
|---|---|---|---|---|---|
| 5,375,334 | A | * | 12/1994 | Coker | 33/194 |
| 5,396,707 | A | * | 3/1995 | Blase | 33/194 |
| 6,231,034 | B1 | | 5/2001 | Walker et al. | |
| 6,615,500 | B2 | * | 9/2003 | Hale et al. | 33/194 |
| 7,580,389 | B2 | * | 8/2009 | Kirk et al. | 370/329 |
| 8,418,375 | B2 | * | 4/2013 | Zadnik | 33/371 |
| 8,517,342 | B2 | * | 8/2013 | Dunca | 254/131 |
| 2003/0204961 | A1 | * | 11/2003 | Sumner | 33/194 |
| 2012/0017452 | A1 | * | 1/2012 | Lam et al. | 33/194 |
| 2012/0255186 | A1 | * | 10/2012 | Allen et al. | 33/194 |

OTHER PUBLICATIONS

"EZ-Hang", http://www.ezhangdoor.com/home, Innovative Construction Enterprises, LLC, at least as early as Jul. 1, 2007.
"Reveal Spacer", http://www.doorframer.com/index.php/spacing-products, DOORFRAMER, Inc., at least as early as Nov. 16, 2007.
"The Quick Door Hanger", http://www.thequickdoorhanger.com/, Express Products, as least as early as Dec. 21, 2008.
"Clip-on Stencil Level", http://www.cuttingedgestencils.com/stencil-level.html?category_id=1010, Innovative Art Concepts, LLC, at least as early as Feb. 18, 2011.

* cited by examiner

*Primary Examiner* — G. Bradley Bennett
(74) *Attorney, Agent, or Firm* — Pauly, DeVries Smith & Deffner LLC (57) ABSTRACT

In one embodiment, a tool for door installation is described herein including a top part configured to fit onto a top edge of a door using a compression fit and comprising a shim portion having a first shim thickness and a hinge side part configured to fit onto an edge of the door using a compression fit, the hinge side part comprising a shim portion having a second shim thickness. The tool further includes a strike side part configured to fit onto an edge of the door using a compression fit, the strike side part comprising a shim portion having a third shim thickness. The tool also includes a level device attached to one of the parts of the tool.

20 Claims, 8 Drawing Sheets

DOOR INSTALLATION TOOL AND METHOD

This patent application claims priority to Provisional Patent Application No. 61/442,111, filed Feb. 11, 2011 and to Provisional Patent Application No. 61/529,163, filed Aug. 30, 2011, the contents of which are hereby incorporated herein by reference.

FIELD

The system and method described relate to a tool for assisting with installation of a door. More particularly, the system relates to simplifying, speeding and improving the accuracy of the installation.

BACKGROUND

Installing a door correctly can be difficult. It requires that the door be level and properly spaced within the opening. Correct installation also requires that the reveals of the jamb be parallel with the door on all sides, and that the proper different spacing is present between the door perimeter and the door jamb. But holding the level, shimming and trying to maintain that required spacing is hard and the install usually ends up less than accurate. Improvements in installation tools could simplify the door installation process and improve the finished product.

SUMMARY

In one embodiment, a tool for door installation is described herein including a top part configured to fit onto a top edge of a door using a compression fit and comprising a shim portion having a first shim thickness and a hinge side part configured to fit onto an edge of the door using a compression fit, the hinge side part comprising a shim portion having a second shim thickness. The tool further includes a strike side part configured to fit onto an edge of the door using a compression fit, the strike side part comprising a shim portion having a third shim thickness. The tool also includes a level device attached to one of the parts of the tool.

In one embodiment, a tool for door installation includes a top part configured to fit onto a top edge of a door using a compression fit and comprising a level device and a shim portion having a first shim thickness, the top part defining a channel. The tool also includes three hinge side parts, wherein each hinge side part is configured to fit onto an edge of the door using a compression fit and each hinge side part comprising a level device and a shim portion having a second shim thickness. The tool further includes three strike side parts, each strike side part is configured to fit onto an edge of the door using a compression fit. The three hinge side parts and three strike side parts are configured to fit within the channel of the top part.

In one embodiment, a method of installing a pre-hung door that includes a door slab and a door frame is described. A first step is providing a door installation tool including a top part configured to fit over a top edge of a door slab using a compression fit and comprising a level device, a hinge side part configured to fit over an edge of the door slab using a compression fit and comprising a level device and a strike side part configured to fit over an edge of the door slab using a compression fit. Another step is positioning the pre-hung door in an opening in a wall and moving the door slab to an open position. Another step is attaching the top part to the top edge of the door, the hinge side part to a hinge side of a door and the strike side part to the strike side of the door. Further steps are adjusting the position of the pre-hung door within the opening until the level devices indicate a level position and fastening jambs of the door frame to the wall.

DETAILED DESCRIPTION OF THE PREFERRED EMBODIMENTS

In one embodiment, an installation tool system includes parts that attach to three edges of a door to provide spacing and leveling indicators to assist with installation. The door includes two major sides: the hinge-pin side and the opposite side. The door also includes perimeter sides defined by a hinge side, a top side, a strike side opposite the hinge side and a bottom side. Doors are often sold as a pre-hung door system where the door or door slab is hung within an assembled unit that includes at least three sides of a door frame and hinges attach the door slab to the door frame. The door frame includes at least two vertical elements which are the hinge jamb and the strike jamb. The door frame also includes a top rail connecting the hinge jamb and the strike jamb at the top of the frame.

To install a pre-hung door system, the door frame is attached to a wall within an opening in the wall. The opening in the wall is defined by the framework of the wall. For proper door operation, specific spacing is recommended between the door slab and the door frame. For example, many manufacturers recommend strike-side spacing of about ⅛ inch (3 mm), hinge-side spacing of about 3/64 inch (1.2 mm) and top spacing of about ⅛ inch (3 mm). The tool described herein can help the installer to establish the correct spacing.

In one embodiment, the parts that make up the tool include the top part, hinge side part and strike side part. Each part attaches to the door slab sides with a compression fit or friction fit, so that they can be easily attached and detached without the use of any tools or any damage to the door slab. The top part, hinge side part and strike side part all include a shim portion which is constructed to provide the correct spacing between the door frame and the door slab. The top part and strike side part include a shim guide portion which is ramped to guide the door slab into the proper position within the door frame in one embodiment. The tool also includes at least one level device in order to indicate to the installer when the door slab is level. In one embodiment, both the hinge side part and the top part include a level device.

In one embodiment, each of the top part, hinge side part and strike side part are configured to define a channel area, where the door edge fits into the channel area with a friction fit. The channel is defined by the shim portion, a first side portion on one side of the shim portion and a second side portion on an opposite side of the shim portion. Before attaching to the door edge, the first side portion and shim portion form an angle of less than 90 degrees, which is also referred to as an over-bend configuration. This over-bend configuration causes the part to squeeze or hold onto the edge of the door so that the part stays in position where placed on the door edge.

Most commercially-available door slabs have a thickness of either about 1¾ inches (4.4 cm) or about 1⅜ inches (3.5 cm). In one embodiment, the three parts of the door installation tool are each provided with at least one fold-down tab so that the part can be configured to fit either of these two typical door thicknesses. In one embodiment, one or more of the parts have two or more fold-down tabs. In one embodiment, the top part includes at least two fold-down tabs. In one embodiment, the top part includes three fold-down tabs. In one embodiment, a foam cylinder can be moved into the channel of each part to adjust the width of the channel of each part instead of a fold-down tab. In one embodiment, two or more fold-down tabs are provided so that the tool can fit a range of door sizes, including non-standard door sizes.

In one embodiment, an installation tool system includes one top part, one hinge side part and one strike side part. In another embodiment, an installation tool system includes one top part, three hinge side parts and three strike side parts. In yet another embodiment, an installation tool system includes one top part, two hinge side parts and two strike side parts. In one embodiment, each of the strike side parts are identical to each other and each of the hinge side parts are identical to each other.

In one embodiment, the system is configured so that one hinge side part and one strike side part can be positioned in a nesting position and then fit within the channel of the top part. In one embodiment, the system is configured so that three hinge side parts and three strike side parts can fit within the channel defined by the top part.

Figure 1:
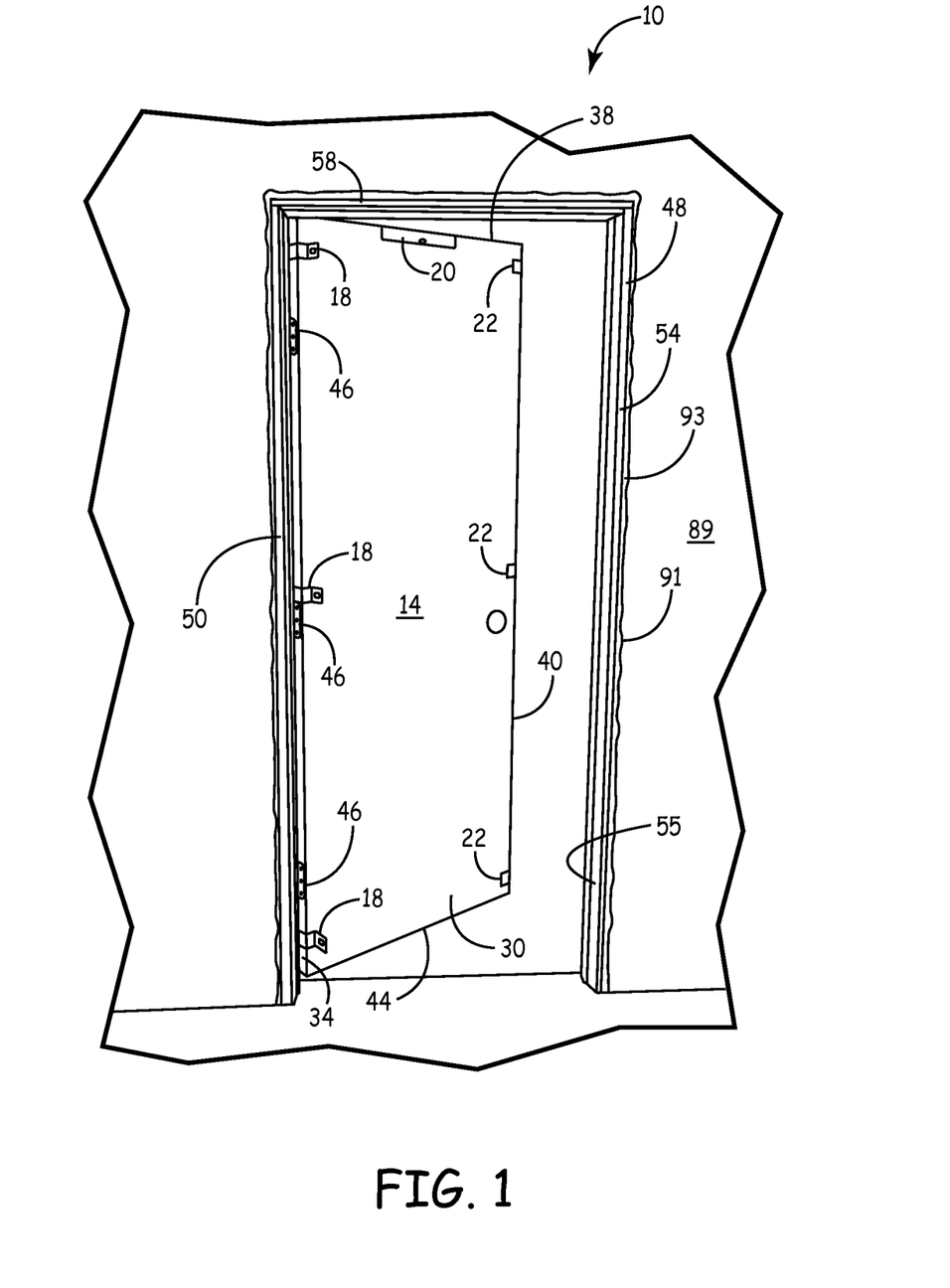
FIG. 1 is a perspective view of one example of a door installation tool in use on a door being installed into a wall including a top part, three hinge side parts and three strike side parts.

FIG. 1 is a perspective view of a pre-hung door 10 or door system 10 with one embodiment of a door installation tool or system attached to the door slab 14. In this embodiment, the tool includes three hinge side parts 18, one top part 20 and three strike side parts 22. The door slab 14 includes a hinge-pin side and an opposite side, where the opposite side 30 is facing the viewer in FIG. 1. Around its perimeter, the door slab 14 also includes a hinge side 34, a top side 38, a strike side 40 opposite the hinge side and a bottom side 44.

The door frame 48 includes at least two vertical elements which are the hinge jamb 50 and the strike jamb 54. The door frame also includes a top rail 58 connecting the hinge jamb 50 and the strike jamb 54 at the top of the frame. The door slab 14 is attached to the door frame 48 by hinges 46. The door system 10 is positioned within an opening in a wall, where a framework is positioned in the opening. The hinge side part and top part both include a level device in this embodiment, which is used by the installer to position the door properly within the framework and opening. It is also possible for the tool to include only a single level. It is also possible for the tool to include one or more levels positioned elsewhere on the tool.

Figure 2:
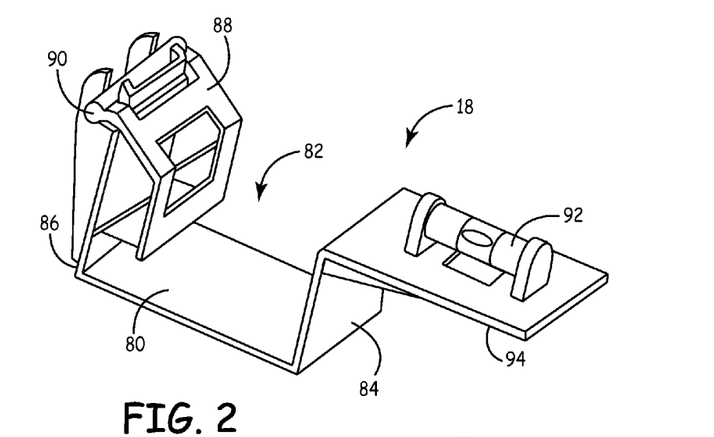
FIG. 2 is a perspective view of one embodiment of a hinge side part.
Figures 3, 4:
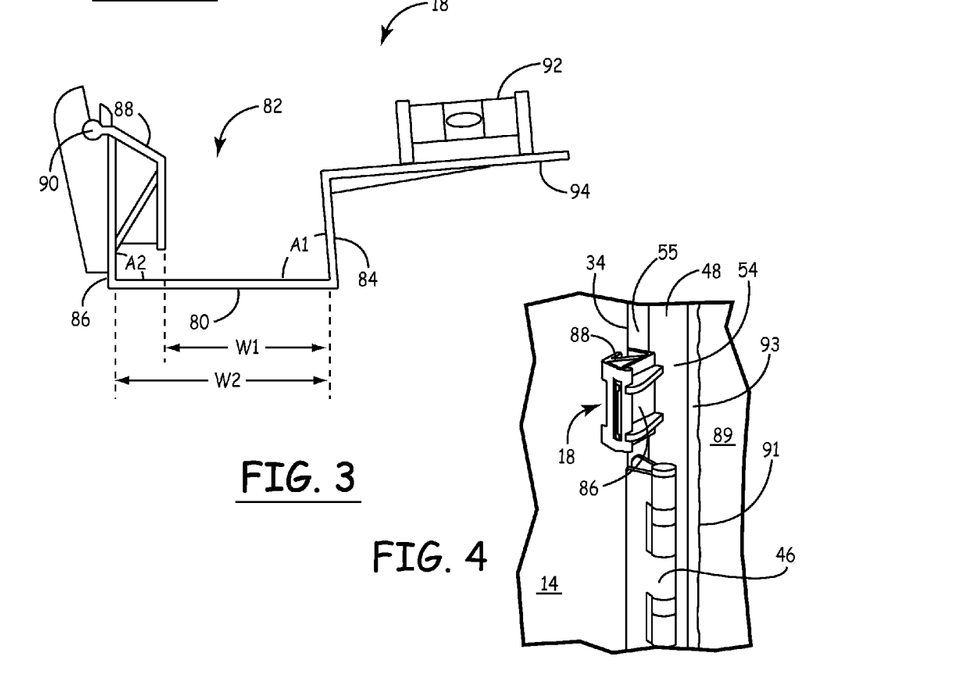
FIG. 3 is a side view of the hinge side part of FIG. 2.
FIG. 4 shows the hinge side part of FIG. 2 on a hinge edge of a door.

One embodiment of a hinge side part 18 is shown in a perspective view in FIG. 2 and a side view in FIG. 3. The hinge side part 18 includes a shim portion 80 which will preserve the proper space between the hinge side of the door slab and the hinge jamb of the door frame. In one embodiment, the shim portion 80 has a uniform thickness as shown in FIG. 3. When the hinge side part 18 is attached to the door slab 14, the shim portion 80 will be flush against the hinge side of the door slab. The thickness of the shim portion 80 of the hinge side part 18 will determine the spacing between the hinge side of the door slab and the hinge jamb of the door frame during the installation process. In one embodiment, the shim portion is rigid and not compressible.

The hinge side part 18 defines a channel 82 that receives the door slab to secure the hinge side part 18 to the door. The channel 82 is defined between a first side portion 84 attached to one side of the shim portion 80 at an angle A1 and a second side portion 86 attached to the opposite side at an angle A2. In one embodiment, angles A1 and A2 are about ninety degrees or slightly less than ninety degrees. If at least one of the angles A1 and A2 is less than 90 degrees, the channel has an over-bend configuration that allows the hinge side part to compression fit around the door edge to secure the hinge side part in place without damaging the door slab. In one embodiment of the hinge side part, angle A1 is about 85 degrees and angle A2 is about 90 degrees.

The hinge side part 18 includes a fold-down tab 88 which can pivot between two positions. A first position is shown in FIGS. 2-3, where the tab 88 occupies a part of the channel 82. In a second position, the tab 88 is positioned outside of the channel 82. With the tab in the first position, the channel 82 has a width of W1. With the tab in the second position, the channel 82 has a width of W2, where W2 is larger than W1. In one embodiment, W1 is about 1⅜ inch (3.5 cm) to fit a 1⅜ inch (3.5 cm) door, while W2 is 1¾ (4.4 cm) so that the part can also fit a 1¾ (4.4 cm) door. The tab 88 can rotate about a pivot point 90 between the first and second positions.

FIG. 4 shows a close-up view of a hinge side part 18 attached to a hinge side 34 of a door slab 14, where the fold-down tab 88 is in a first position. (Only the edge of the hinge side 34 is visible in FIG. 4.) The second side portion 86 of the hinge side part 18 includes the fold-down tab 88 and is visible in FIG. 4. The second side portion 86, which includes the fold-down tab, is positioned on the hinge-pin major surface of the door slab. This orientation enables the installer to see the level device 92 when standing on the opposite side of the door from the hinge-pin side. (It is also possible for the installer to be standing on the hinge-pin side during the installation process or certain steps of the installation process. For example, when installing a door with the brick molding already attached, the installer will be standing on the hinge-pin side of the door when securing the unit into the wall, and will open and close the door to check the level devices before fastening.) This same orientation is desired for the top part 20 and the strike side part 22: The fold-down tab portion of each part is positioned on the hinge-pin side of the door slab.

Also visible in FIG. 4, the hinge 46 is attached to both the hinge side 34 of the door slab 14 and to the hinge jamb 54 of the door frame 48. The door frame 48 is positioned within a rough opening 91 in a wall 89. A space 93 is present between the wall 89 and the door frame 48. As discussed herein, if needed, shims are placed in at a few locations in the space 93 during the installation process to adjust the position of the door.

Now referring to FIGS. 2 and 3, a level 92 is also included on the hinge side part 18. In one embodiment, the level 92 is positioned on a level portion 94 that projects away from the first side portion 84 at about a ninety degree angle. By watching to see if the bubble of the level is centered, the installer can determine if the door is level on the vertical axis. In the embodiment of FIGS. 2-3, the level is held by two level brackets which are integral with the level portion of the hinge side part. In another embodiment, the level is attached using adhesive. In another embodiment, the level portion includes a clip into which a level can snap.

Figure 5:
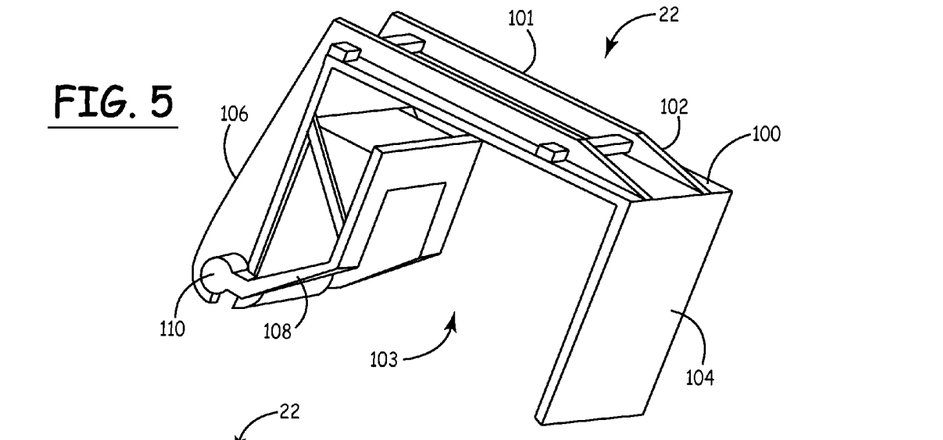
FIG. 5 is a perspective view of one embodiment of a strike side part.
Figures 6, 7:
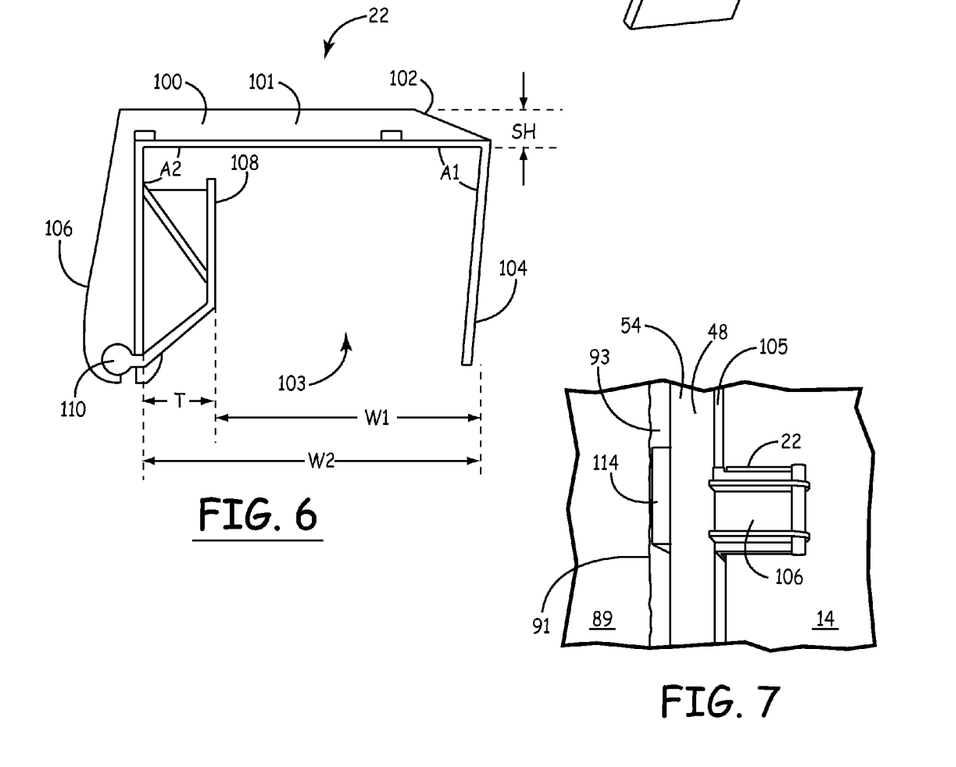
FIG. 6 is a side view of the strike side part of FIG. 5.
FIG. 7 is a front view of a strike side part in use during installation of a pre-hung door.

One embodiment of a strike side part 22 is shown in a perspective view in FIG. 5 and a side view in FIG. 6. The strike side part 22 includes a shim portion 100 which will preserve the proper space between the strike side of the door slab and the strike jamb of the door frame.

When the strike side part 22 is attached to the door slab 14, the shim portion 100 will be flush against the strike side of the door slab. In one embodiment, the shim portion 100 has a thicker part 101 and a ramped part 102. The thickness SH of the thicker part 101 of the shim portion 100 of the strike side part 22 is shown in FIG. 6 and will determine and preserve the spacing between the strike side of the door slab and the strike jamb of the door frame during the installation process. Over the ramp portion 100, the total thickness of the shim portion is gradually increased until the ramp portion 102 meets the thicker portion 101.

After the strike side part 22 is installed on the strike side of a door, the door slab is moved to a closed position within the door frame. The ramp portion 102 will help to guide the door slab into position within the door frame.

Like the hinge side part, the strike side part 22 defines a channel 103 that receives the door slab to secure the strike side part 22 to the door. Like the hinge side part, channel 103 is defined between a first side portion 104 attached to one side of the shim portion 100 at an angle A1 and a second side portion 106 attached to the opposite side at an angle A2. In one embodiment, angles A1 and A2 are about ninety degrees or slightly less than ninety degrees. In one embodiment, one of the angles A1 and A2 is less than 90 degrees and the channel has an over-bend configuration that allows the strike side part to compression fit around the door edge to secure the strike side part in place without damaging the door slab. In one embodiment of the strike side part, angle A1 is about 85 degrees and angle A2 is about 90 degrees.

FIG. 7 shows a close-up view of the strike side part 22 positioned on the strike side of a door slab 14, with the second side portion 106 facing the viewer. In FIG. 7, the door slab 14 is in a closed position within the door frame 48. The strike jamb 54 of the door frame is spaced from the door slab 14 by strike-side reveal space 105. FIG. 7 also shows that the door frame 48 fits within the rough opening 91 in the wall and that the door frame is separated from the wall 89 by a space 93. During the installation process, if needed, the installer will insert shims, such as shim 114 shown in FIG. 7, into the space 93 in order to adjust and level the door's position. By inserting the shim in a position that overlaps vertically with one of the strike side parts 22 as shown in FIG. 7, the strike side part 22 can act as a backing for the shimming process. Without the strike side part 22 acting as a backing, the door frame 48 may flex away from the location of shim 114 and affect the dimension of the reveal space 105. For proper door operation, strike-side reveal space is about ⅛ inch (3 mm) in one embodiment. The strike side part 22 therefore preserves the proper strike side reveal space.

Similarly, the hinge side part 18 can provide backing during the shimming process and thereby preserves the proper hinge side reveal space. In one embodiment, the hinge-side reveal space that provides for good door operation is about 3/64 inch (1.2 mm). The top part 20 can also provide backing during the shimming process and thereby preserves the proper top reveal space. In one embodiment, a top reveal space that provides for good door operation is about ⅛ inch (3 mm). Different door manufacturers and different door systems can have different reveal spacing. The shim portions of the strike side part, hinge side part and top part can be configured to preserve the reveal spacing that is best for each system.

Figures 8, 9, 12:
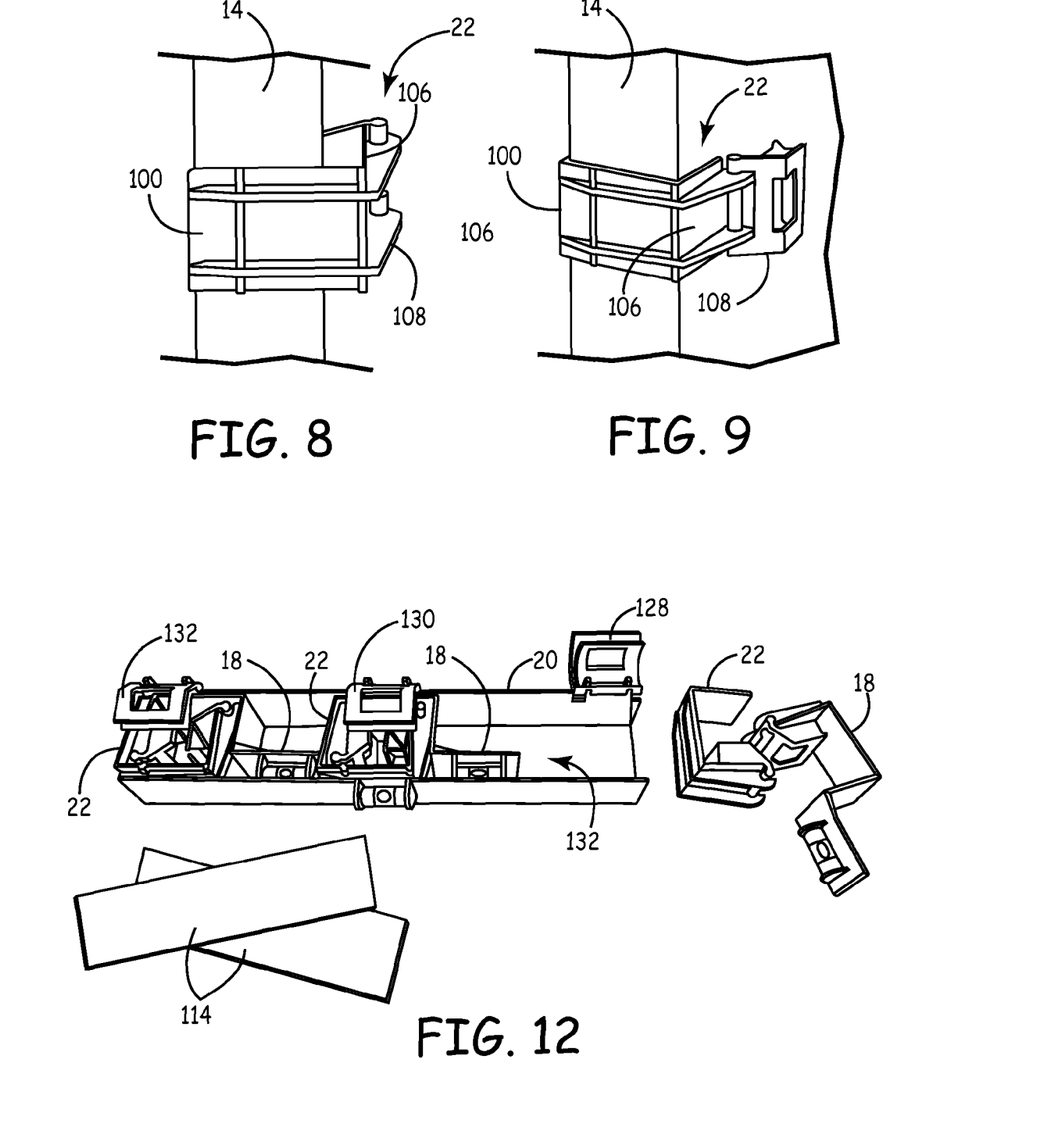
FIG. 8 shows a strike side part installed on an edge of a door of a first thickness, where the fold-down tab is folded down.
FIG. 9 shows a strike side part installed on an edge of a door of a second thickness greater than the first thickness shown in FIG. 8, where the fold-down tab is folded up.
FIG. 12 shows one embodiment of a door installation system, where two of the hinge side parts and two of the strike side parts are positioned in a channel of a top part, and a hinge side part and a strike side part are shown in a nested position outside of the channel.

The strike side part 22 includes a fold-down tab 108 having a thickness T which can pivot between two positions. A first position is shown in FIGS. 6-7, where the tab 108 occupies a part of the channel 103. FIG. 8 shows a strike side part 22 installed on a door edge, with the tab 108 in a first position occupying part of the channel 103. In a second position, the tab 108 is positioned outside of the channel 103, as shown in FIG. 9. In FIGS. 8 and 9, the shim portion 100 and the second side portion 106 are visible. Now referring to FIG. 6, with the tab in the first position, the channel 103 has a width of W1. With the tab in the second position, the channel 103 has a width of W2, where W2 is larger than W1. The difference between W2 and W1 is T. In one embodiment, W1 is about 1⅜ inch (3.5 cm) so that the strike side part 22 will fit over a door having that thickness, while W2 is 1¾ inch (4.4 cm), so that the strike side part 22 can also fit over a door having that thickness. The tab 108 can rotate about a pivot point 110 between the first and second positions.

Figure 10:
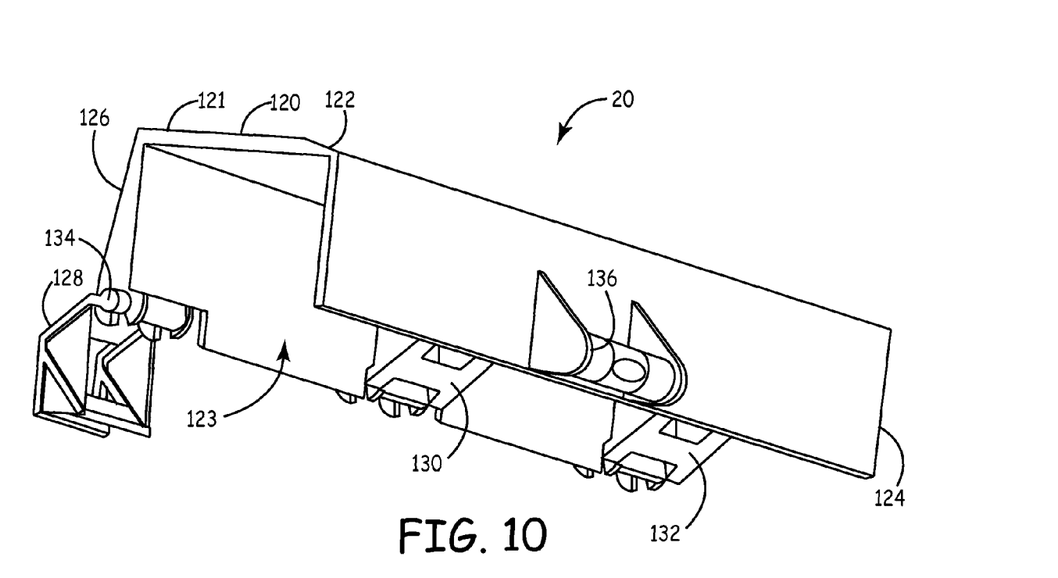
FIG. 10 is a perspective view of one embodiment a top part.
Figure 11:
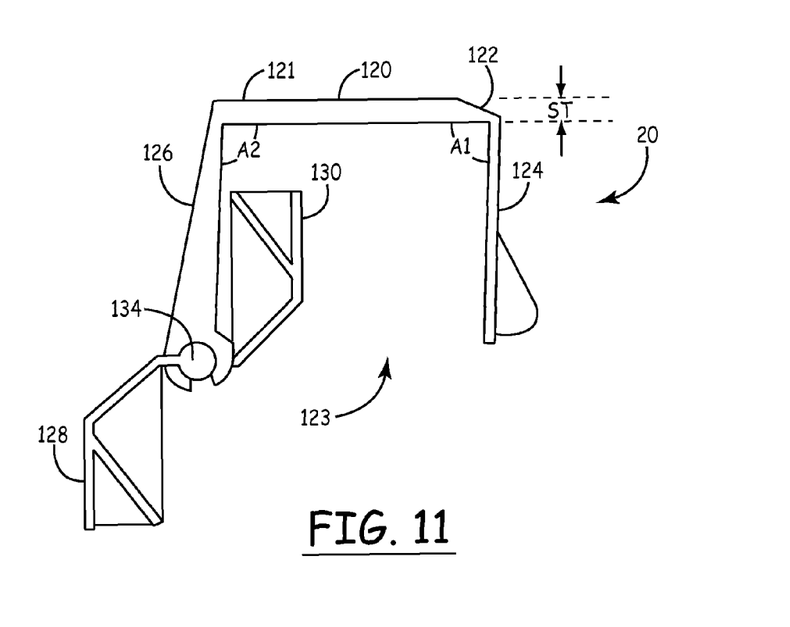
FIG. 11 is a side view of the top part of FIG. 10.

One embodiment of a top side part 20 is shown in a perspective view in FIG. 10 and a side view in FIG. 11. The top side part 20 includes a shim portion 120 which will preserve the proper space between the top side of the door slab and the top jamb of the door frame.

When the top side part 20 is attached to the door slab 14, the shim portion 120 will be flush against the top side of the door slab 14. In one embodiment, the shim portion 120 has a thicker part 121 having a thickness ST as shown in FIG. 11 and a ramp portion 122. Similar to the strike side part, the thickness ST will determine the spacing between the top side of the door slab and the top rail of the door frame during the installation process. Over the ramp portion 122, the total thickness of the shim portion is gradually increased until the ramp portion 122 meets the thicker portion 121.

After the top side part 20 is installed on the top side of a door, the door slab is moved to a closed position within the door frame. The ramp portion 122 will help to guide the door slab into position within the door frame.

The top side part 20 defines a channel 123 that receives the door slab to secure the top side part 20 to the door. The top side part 20 includes a first side portion 124 attached to one side of the shim portion 120 and a second side portion 126 attached to the opposite side. The first side portion 124 forms an angle A1 with the shim portion 120 and the second side portion 126 forms an angle A2 with the shim portion. In one embodiment, angles A1 and A2 are about ninety degrees or slightly less than ninety degrees. If at least one of the angles A1 and A2 is less than 90 degrees, the channel has an over-bend configuration that allows the top part to compression fit or friction fit around the door edge to secure the top part in place without damaging the door slab. In one embodiment of the top part, angle A1 is about 88 degrees and angle A2 is about 90 degrees.

The top part 20 is longer than either the hinge side part 18 or the strike side part 22 in the embodiment shown in FIGS. 2-9. In one embodiment, the top part 20 has a length of about 10.5 inches (26.7 cm), while each of the hinge side part and strike side part has a length of about 1⅜ inch (3.5 cm).

In one embodiment, the top side part 20 includes three fold-down tabs 128, 130, 132 which can pivot between two positions. In FIGS. 10-11, two tabs 130, 132 are in a first position occupying part of the channel 123. Another tab 128 is shown in a second position where the fold-down tab 128 does not occupy any part of the channel. Similar to as discussed and illustrated for the hinge side part and strike side part, the channel 123 has a width of W1 and the tab has a width T. With the tab in the second position, the channel 123 has a width of W2, where W2 is larger than W1. The difference between W2 and W1 is T. In one embodiment, W1 is about 1⅜ inch (3.5 cm) so that the top side part 20 will fit over a door having that thickness, while W2 is 1¾ (4.4 cm), so that the top side part 20 can also fit over a door having that thickness. The tabs 128, 130, 132 rotate about a pivot axis 134 between the first and second positions.

A level 136 is also included on the top side part 20. In one embodiment, the level 136 is positioned on the first side portion 124. By watching to see if the bubble of the level is centered, the installer can determine if the door is level on the horizontal axis. In the embodiment of FIGS. 10-11, the level is held to the top part by two level brackets which are integral with the level portion of the hinge side part. In another embodiment, the level is attached using adhesive. In another embodiment, the level portion includes a clip into which a level can snap.

In one embodiment, each of the parts of the tool defines a channel bordered by the shim portion, first side portion and second side portion. As discussed herein, the angle A1 is formed between the first side portion and shim portion of each part and the angle A2 is formed between the shim portion and the second side portion. In one embodiment, angles A1 and A2 are about ninety degrees or slightly less than ninety degrees. In one embodiment, angles A1 and A2 are both less than ninety degrees. In one embodiment, angle A1 is less than ninety degrees and angle A2 is about ninety degrees. In one embodiment, angle A1 is at least about eighty degrees. In one embodiment, angle A1 is at least about 84 degrees. In one embodiment, angle A1 is at least about 85 degrees. In one embodiment, angle A1 is about 85 degrees. In one embodiment, angle A1 is about 88 degrees.

Fold-down tabs have been described that can pivot between two positions corresponding to two different door thicknesses. Many different structures can be used to allow the parts to fit multiple door sizes. In one embodiment, each part includes at least two tabs of two different sizes so that each part can be configured to fit three different door thicknesses. In one embodiment, each of the parts has two fold-down tabs of the same size. In one embodiment, spacing structures clip into or fit into the channel of each part to adjust the channel width.

In one embodiment, a level is present on at least one part of the tool. In one embodiment, a level device is present on the top part. In one embodiment, a level is present on at least one of the hinge side parts. In one embodiment, a level is present on all of the hinge side parts. In one embodiment, a level is present on all of the hinge side parts and the top part. In one embodiment, a level device is present on one or more of the strike side parts. In one embodiment the level has an open area underneath of it to allow the level to be read from all angles. In one embodiment, the level is held to the particular part between two brackets which are integral with the level portion of the hinge side part and the first side portion of the top part. In another embodiment, the level is attached using adhesive. In another embodiment, the level portion includes a clip into which a level can snap or be held.

In one embodiment, the parts of the tool are constructed of a hard material such as a plastic, a resin, a nylon resin or a thermoplastic material. The parts of the tool can be formed by injection molding, extrusion, metal bending or other methods. In one embodiment, the parts are formed by injection molding using a resin commercially available as ZYTEL® resin from DuPont. In one embodiment, the fold-down tabs are formed in one injection molding process while the remainder of each part is formed in a separate injection molding process and then the pieces are connected. In one embodiment, an extrusion process is used to form at least one portion of each part. The FIGS. show ribs on some portions of the parts of the tool. In some embodiments, ribs are present in different locations or are not present.

In one embodiment, portions of the parts of the tool are formed using metal bending of a metal such a stainless steel. Edges of the tools are covered with soft rubber in one embodiment. In one embodiment, thermoforming techniques are used to form the parts of the tool.

Figure 13:
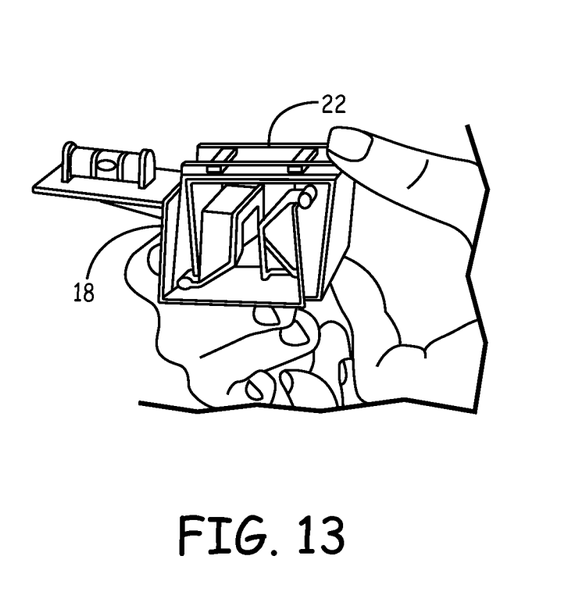
FIG. 13 shows a side view of a hinge side part and a strike side part in a nested position.

Now referring to FIGS. 12 and 13, in one embodiment, the hinge side part 18 and the strike side part 22 are configured so that the fold-down tab portion of one part can fit into the channel of the other part. In FIG. 12, parts 18, 22 are shown positioned near each other and oriented so that they will fit together in a nested position. In FIG. 13, parts 18, 22 are shown fitted together where the fold-down tab portion of one part is positioned within the channel of the other part. FIG. 12 shows how the nested parts 18, 22 can be positioned within the channel 132 of the top part 20. Tabs 128, 130, 132 of the top part 20 are be pivoted away from the channel 132 to allow the nested parts 18, 22 to be placed in the channel 132, and then can be pivoted toward the channel 132 for compact storage of the tool. FIG. 12 also shows two shims 114 which can be used during the installation process. It is not uncommon to use more than two shims during the installation process.

The tool embodiments described herein can be used during the installation of many different types of doors. Examples include hinged doors, pre-hung doors, interior doors, exterior doors, doors with side lights, hinged patio doors, knockdown doors, and split jamb pre-hung doors, among others.

Before starting a door installation process, the installer will carefully measure the opening and the door unit. The opening should be as tall as the door frame height plus ½ inch (1.3 cm). The opening should be as wide as the frame width plus ½ inch (1.3 cm) to ¾ inch (1.9 cm). The installer will also determine whether the framework of the rough opening is vertical and square using a string test. In one embodiment, a first step is to place the pre-hung door into the opening and swing the door slab open to more than 90 degrees from the door frame. In this position, the pre-hung door will stand up on its own.

Now referring to FIG. 1, in one embodiment for installing a pre-hung interior door, a further step is to attach the three hinge side parts 18 to the hinge side 34 of the door slab 14, approximately equally spaced along the door edge. Another step is to attach the three strike side parts 22 to the strike side 40 of the door 14, approximately equally spaced along the door edge. Another step is to attach the top part 20 to the top edge 38 of the door 14 in a central location. Each part is placed on the door edge with the second side portions and tabs positioned on the hinge-pin side of the door. This orientation is shown for the hinge side part 16 in FIG. 4 and is discussed with respect to FIG. 4.

The installer positions himself or herself near the major side of the door that is opposite from the hinge-pin side of the door. Again referring to FIG. 1, the installer observes the levels on the hinge side parts 18 and top part 20 to determine if the door is level and plumb. If the door is not level or not plumb or both, the installer adjusts the position of the door unit. The installer may also insert shims 114 into the space 93 between the door frame 48 and the wall 89, as shown in FIG. 7, to assist with repositioning the door unit. In one embodiment, the shims are inserted into space 93 only at positions that overlap with the hinge side parts and strike side parts so that the parts can serve as a backing for the shims. Again referring to FIG. 1, when the installer is satisfied that the door is sufficiently level and plumb by referring to the level device or devices, the installer will fasten the door frame 48 to the wall at locations close to the locations of the hinge side parts 18. If shims were inserted into the hinge reveal space, then the fasteners may pass through the shims. Examples of fasteners include nails and screws, among others.

Another step in one embodiment is pulling the door slab 14 to a closed position within the door frame 48. The ramp portions on the top and strike side parts 20, 22 will assist with guiding the door slab 14 into the frame 48. The shim portions of each of the parts will maintain the door slab 14 at the desired spacing distances from each of the sides of the door frame. Another step in one embodiment is to insert shims in the space between the top rail 58 of the door frame 48 and the wall until the door frame 48 is snuggly in position. Then the installer fastens the top rail 58 of the door frame 48 to the wall through any shim location.

Another step in one embodiment is to insert shims between the door frame 48 and wall near the strike side parts 22. Then the installer fastens the strike jamb 54 of the door frame 48 to the wall through any shim location. Next, the installer opens the door past 90 degrees and removes the tool parts. The tool parts may be fit together for compact storage as shown in FIGS. 12 and 13. A bag or carrying case can be provided to carry the tool.

For an exterior pre-hung door, the steps are generally the same as described for an interior pre-hung door. Some additional steps that may be taken for an exterior door include flashing and weatherizing the opening according to the requirements of the door manufacturer. Also, the fastening steps will sometimes need to be performed with the door in an open position, after checking that the door unit is level, plumb and snuggly fit within the opening while the door is in the closed position.

For a split jamb pre-hung door, the steps are generally the same as described for an interior pre-hung door except that those installation steps are performed on the portion of the door unit that has the door slab attached to it. After that portion is hung, the tool parts are removed and the remaining portion of the jamb is installed in the unit.

The tool described herein can also be used to install a door slab and door frame that are not provided separately where the door slab is not pre-hung in the frame. In one embodiment, a step is to attach the tool parts to the door slab, just as described for the interior pre-hung door. Then the door frame is built around the door slab and the tool parts are useful to provide the reveal spacing around the door slab. Once the unit is assembled, the same instructions are followed as for the pre-hung interior door.

Figure 14:
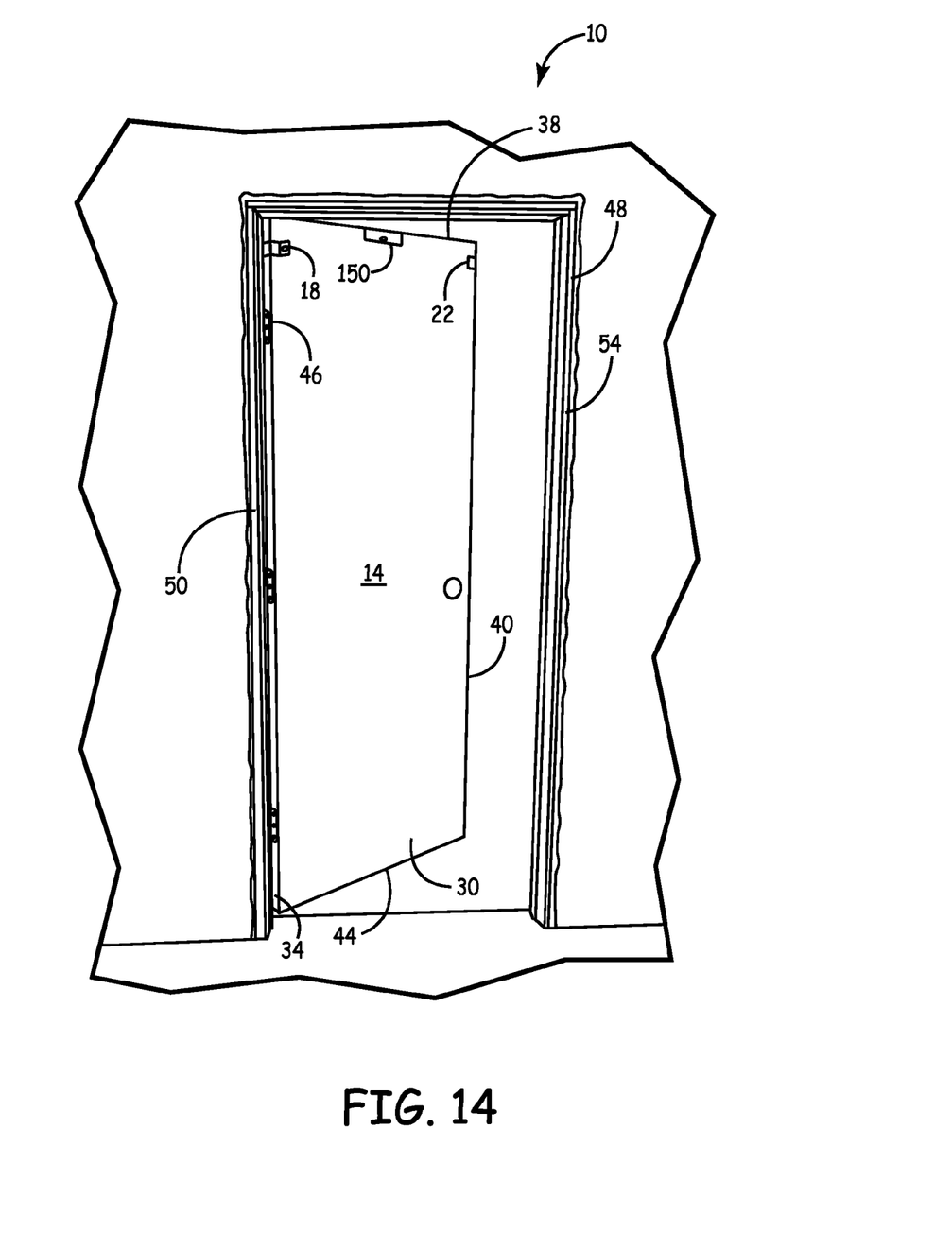
FIG. 14 is a perspective view of another example of a door installation system in use on a door being installed into a wall including a top part, a hinge side part and a strike side part.

FIG. 14 shows a perspective view of an alternate tool system on a door unit. The alternate system includes one hinge side part 18 and one strike side part 22. The system also includes a top part 150. The top part 150 differs from top part 20 by being shorter and having two fold-down tabs 166, 168 instead of three fold-down tabs. In other respects, the top part 150 has the features of the top part 20.

One embodiment of a top side part 150 is shown in a perspective view in FIG. 14. A side view of top part 150 is not included because it is identical to the side view of top part 20. The top side part 150 includes a shim portion 154 which will preserve the proper space between the top side of the door slab and the top jamb of the door frame.

When the top side part 150 is attached to the door slab 14, the shim portion 154 will be flush against the top side of the door slab 14. In one embodiment, the shim portion 154 has a thicker part having a thickness ST and a ramp portion. The thickness ST will determine the spacing between the top side of the door slab and the top rail of the door frame during the installation process. Over the ramp portion, the total thickness of the shim portion is gradually increased until the ramp portion meets the thicker portion.

After the top side part 150 is installed on the top side of a door, the door slab is moved to a closed position within the door frame. The ramp portion will help to guide the door slab into position within the door frame.

The top side part 150 defines a channel 160 that receives the door slab to secure the top side part 150 to the door. The top side part 150 includes a first side portion 162 attached to one side of the shim portion 154 and a second side portion 164 attached to the opposite side. The first side portion 162 forms an angle A1 with the shim portion 154 and the second side portion 164 forms an angle A2 with the shim portion. In one embodiment, angles A1 and A2 are about ninety degrees or slightly less than ninety degrees. If at least one of the angles A1 and A2 is less than 90 degrees, the channel has an overbend configuration that allows the top part to compression fit or friction fit around the door edge to secure the top part in place without damaging the door slab. In one embodiment of the top part, angle A1 is about 88 degrees and angle A2 is about 90 degrees.

The top part 150 is longer than either the hinge side part 18 or the strike side part 22 in the embodiment shown in FIGS. 2-9. In one embodiment, the top part 150 has a length of about 4 inches (10.2 cm), while each of the hinge side part and strike side part has a length of about 1⅜ inch (3.5 cm).

Figure 15:
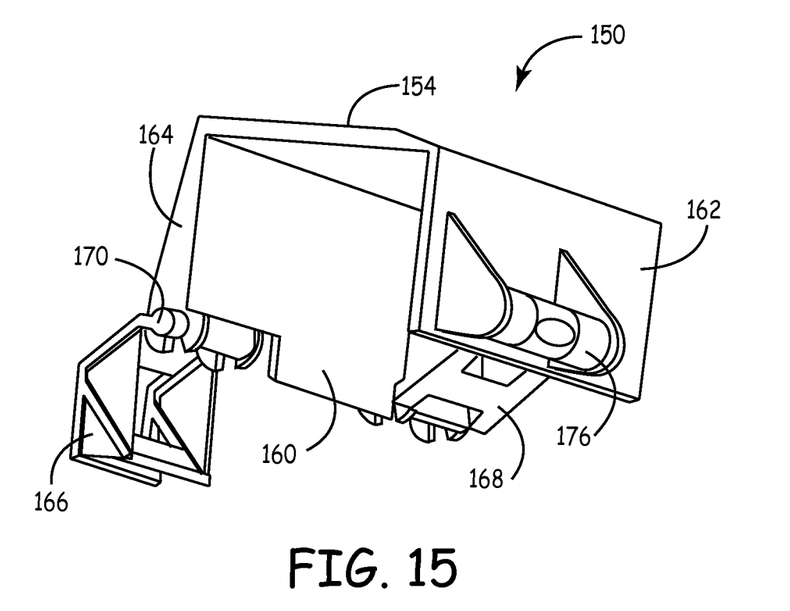
FIG. 15 is a perspective view of another embodiment of a top part.

In one embodiment, the top side part 150 includes two fold-down tabs 166, 168 which can pivot between two positions. In FIG. 15, one tab 168 is in a first position occupying part of the channel 160. Another tab 166 is shown in a second position where the fold-down tab 166 does not occupy any part of the channel. Similar to as discussed for the hinge side part and strike side part, the channel 160 has a width of W1 and the tab has a width T. With the tab in the second position, the channel 160 has a width of W2, where W2 is larger than W1. The difference between W2 and W1 is T. In one embodiment, W1 is about 1⅜ inch (3.5 cm) so that the top side part 150 will fit over a door having that thickness, while W2 is 1¾ inch (4.4 cm), so that the top side part 150 can also fit over a door having that thickness. The tabs 166, 168 rotate about a pivot axis 170 between the first and second positions.

A level 176 is also included on the top side part 150. In one embodiment, the level 176 is positioned on the first side portion 162. By watching to see if the bubble of the level is centered, the installer can determine if the door is level on the horizontal axis. In the embodiment of FIG. 15, the level is held to the top part by two level brackets which are integral with the level portion of the hinge side part. In another embodiment, the level is attached using adhesive. In another embodiment, the level portion includes a clip into which a level can snap.

When the alternate tool of FIGS. 14-15 is used by an installer, steps similar to those described herein are followed except that the single hinge side part 18 is moved to the different locations along the hinge side 34 of the door slab 14 before checking the position and then shimming and fastening at each of the hinge side part locations shown in FIG. 1. Also, the single strike side part 22 is moved to the different locations along the strike side 40 of the door slab 14 before checking the position and then shimming and fastening at each of the strike side part locations in FIG. 1.

The tool of FIGS. 14-15 is configured for compact storage in one embodiment. The strike side part 22 and the hinge side part 18 can be nested together as shown in FIG. 12 and positioned within the channel 160 of the top part 150.

An example of a tool and method for installing a door has been described, but those of skill in the art will be aware of many options and alternatives to the equipment and method steps described that can be used.

Various embodiments are described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

What is claimed is:

1. A tool comprising:
   a. a top part configured to fit onto a top edge of a door using a compression fit and comprising a shim portion having a first shim thickness;
   b. a hinge side part configured to fit onto an edge of the door using a compression fit, the hinge side part comprising a shim portion having a second shim thickness;
   c. a strike side part configured to fit onto an edge of the door using a compression fit, the strike side part comprising a shim portion having a third shim thickness; and
   d. a level device attached to one of the parts of the tool.

2. The tool of claim 1 wherein each of the parts comprise a fold-down tab configured to allow a compression fit on doors of reduced thickness.

3. The tool of claim 2 wherein at least one of the parts comprises two fold-down tabs of the same size.

4. The tool of claim 2 wherein each of the parts comprises two or more fold-down tabs of different sizes.

5. The tool of claim 1 comprising a first additional hinge side part and a second additional hinge side part, each hinge side part configured to fit over an edge of the door using a compression fit and comprising a shim portion having the second shim thickness.

6. The tool of claim 1 further comprising a first additional strike side part and a second additional strike side part, each strike side part configured to fit over an edge of the door using a compression fit and comprising a shim portion having the third shim thickness.

7. The tool of claim 1 wherein the top part, hinge side part and strike side part each further comprise:
   a first side portion extending from one side of the shim portion; and
   a second side portion extending from the opposite side of the shim portion;
   wherein the first side portion and the shim portion form an angle of less than 90 degrees.

8. The tool of claim 7 wherein the level device is affixed to the top part.

9. The tool of claim 8 wherein the level device of the top part is attached to the first side portion of the top part and the fold-down tab of the top part is attached to the second side portion of the top part.

10. The tool of claim 1 wherein the level device is attached to the top part and the hinge side part further comprises an additional level device.

11. The tool of claim 1 wherein the top part defines a channel, wherein the hinge side part and the strike side part are configured to fit within the channel.

12. The tool of claim 1 wherein the first and third shim thicknesses are equal.

13. The tool of claim 12 wherein the first and third shim thicknesses are each about ⅛ inch (3 mm) and the second shim thickness is about 3/64 inch (1.2 mm).

14. The tool of claim 1 wherein the shim portions of the top part and the strike side part comprise a ramp portion.

15. A tool comprising:
   a. a top part configured to fit onto a top edge of a door using a compression fit and comprising a level device and a shim portion having a first shim thickness, the top part defining a channel;
   b. three hinge side parts, wherein each hinge side part is configured to fit onto an edge of the door using a compression fit and each hinge side part comprising a level device and a shim portion having a second shim thickness; and
   c. three strike side parts, each strike side part is configured to fit onto an edge of the door using a compression fit;
   wherein the three hinge side parts and three strike side parts are configured to fit within the channel of the top part.

16. The tool of claim 15 wherein each of the parts comprise a fold-down tab configured to allow a compression fit on doors of reduced thickness.

17. The tool of claim 16 wherein each of the top part, hinge side part and strike side part each further comprise:
   a first side portion extending from one side of the shim portion; and
   a second side portion extending from the opposite side of the shim portion;
   wherein the first side portion and the shim portion form an angle of less than 90 degrees.

18. The tool of claim 17 wherein the level device of the top part is attached to the first side portion of the top part and the fold-down tab of the top part is attached to the second side portion of the top part.

19. The tool of claim 15 wherein the first and third shim thicknesses are equal.

20. A method of installing a pre-hung door comprising a door slab and a door frame, the method comprising the steps of:
   a. providing a door installation tool comprising:
      a. a top part configured to fit over a top edge of a door slab using a compression fit and comprising a level device;
      b. a hinge side part configured to fit over an edge of the door slab using a compression fit and comprising a level device; and
      c. a strike side part configured to fit over an edge of the door slab using a compression fit;
   b. positioning the pre-hung door in an opening in a wall and moving the door slab to an open position;
   c. attaching the top part to the top edge of the door, the hinge side part to a hinge side of a door and the strike side part to the strike side of the door;

d. adjusting the position of the pre-hung door within the opening until the level devices indicate a level position; and e. fastening jambs of the door frame to the wall.

* * * * *